US006592494B2

(12) United States Patent
St. Pierre et al.

(10) Patent No.: US 6,592,494 B2
(45) Date of Patent: Jul. 15, 2003

(54) CLUTCH PEDAL ASSEMBLY

(75) Inventors: John C St. Pierre, Sterling Heights, MI (US); Robert L Brown, Waterford, MI (US); Michael J Drews, Rochester Hills, MI (US); Michael X Schafer, Holly, MI (US); Brian L Wagoner, Farmington Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/969,425

(22) Filed: Oct. 1, 2001

(65) Prior Publication Data

US 2003/0064859 A1 Apr. 3, 2003

(51) Int. Cl.[7] ................................................ B60K 41/02

(52) U.S. Cl. ........................... 477/167; 74/512; 74/560; 192/99 S

(58) Field of Search ................................ 477/167, 181; 74/512, 560; 180/334; 192/13 R, 99 S

(56) References Cited

U.S. PATENT DOCUMENTS 4,426,890 A * 1/1984 Hansen ........................ 74/478
4,779,713 A * 10/1988 Tomala et al. ............ 192/88 A
4,867,261 A * 9/1989 King .......................... 180/179
5,404,979 A 4/1995 Craft et al. .............. 192/70.25
5,676,220 A 10/1997 Dapsi et al. ................ 180/334
5,921,144 A * 7/1999 Williams et al. .............. 74/512
6,155,393 A * 12/2000 Goto ........................ 192/13 R
6,173,625 B1 * 1/2001 McFarlane et al. ........... 74/512
6,223,865 B1 * 5/2001 Lang et al. .............. 188/73.31
6,286,388 B1 * 9/2001 Brewer ......................... 74/512
6,321,617 B1 * 11/2001 Schwyn ........................ 74/512
6,491,147 B1 * 12/2002 Kargilis et al. ........... 192/13 R

FOREIGN PATENT DOCUMENTS

DE 199 52 426 A1 * 3/2001 ............ G05G/1/14

* cited by examiner

*Primary Examiner*—Richard M. Lorence
*Assistant Examiner*—David D. Le
(74) *Attorney, Agent, or Firm*—Donald J. Wallace

(57) ABSTRACT

A clutch pedal assembly is provided including a support bracket for pivotally mounting a clutch arm and an actuator arm. The clutch arm includes a clutch pedal for enabling actuation by a vehicle operator and the actuator arm is attached to a linkage for manipulating a master cylinder of a hydraulically actuated clutch release system. The clutch arm and actuator arm are interconnected via a pair of drag links, whereby operator actuation of the clutch arm results in corresponding actuation of the actuator arm.

8 Claims, 7 Drawing Sheets

CLUTCH PEDAL ASSEMBLY

FIELD OF THE INVENTION

The present invention generally relates to clutch pedal assemblies and more particularly to an improved clutch pedal assembly for a hydraulically actuated clutch.

BACKGROUND OF THE INVENTION

Conventional motor vehicles include a motor, such as an internal combustion engine, for driving the wheels of the vehicle. The output power of the motor is transferred to the wheels through a transmission for driving the wheels at various speed ratios. Commonly known transmission types include manual and automatic. For manual-type transmissions, a clutch system is further included for disengaging the motor from the transmission during a shift between gear ratios. The clutch system is actuated by a vehicle operator via a clutch pedal assembly located within an occupant compartment of the vehicle.

In general, clutch systems can be either cable actuated or hydraulically actuated. For cable actuated clutch systems, the clutch pedal assembly functions to pull a clutch cable connected to the clutch system, thereby actuating the clutch release system. In contradistinction, the clutch pedal assembly of hydraulically actuated clutch system functions to push a piston of a master cylinder, thereby actuating the clutch release system. Because of the push/pull distinction between hydraulically actuated and cable actuated clutch systems, the vehicle must be modified accordingly to fit the particular clutch system. Modifications to the dash panel and positioning of other components to ensure proper packaging differ depending on the type of clutch system used. As a result, multiple designs must be engineered and manufactured for each vehicle type, to ensure either clutch system will fit properly. This serves to increase the overall manufacturing costs of the vehicle.

It is therefore desirable in the industry to provide a clutch pedal assembly that eliminates the necessity of redundant designs for fitting one of either a cable actuated clutch pedal assembly or a hydraulically actuated clutch pedal assembly. In this manner, a single vehicle design can implement either a cable actuated clutch system or a hydraulically actuated clutch system, without further modification, thereby reducing overall manufacturing costs.

SUMMARY OF THE INVENTION

A pedal assembly is provided comprising a mounting bracket, a first arm pivotally attached to the mounting bracket at a first end and having a pedal disposed at a second end, a second arm pivotally attached to the mounting bracket at a first end and having a linkage attached at a second end. The first arm is in mechanical communication with the second arm whereby pivoting of the second arm follows pivoting of the first arm for manipulating the linkage. A preferred embodiment of the present invention includes at least one drag link interconnecting the first arm and the second arm. The pedal assembly is preferably a clutch pedal assembly for actuation of a hydraulic clutch system of a vehicle.

A combination brake and clutch pedal assembly is also provided, comprising a first mounting bracket, a brake arm pivotally attached to the first mounting bracket at a first end and having a pedal disposed at a second end, a second mounting bracket fixedly attached to the first mounting bracket, a clutch arm pivotally attached to the second mounting bracket at a first end and having a pedal disposed at a second end, an auxiliary arm pivotally attached to the second mounting bracket at a first end and having a linkage attached at a second end, and wherein the clutch arm is in mechanical communication with the auxiliary arm whereby pivoting of the auxiliary arm follows pivoting of the clutch arm for manipulating the linkage.

An advantage of the above-described pedal assemblies is that each enables the implementation of a hydraulically actuated clutch system in a vehicle that is designed and packaged for the clutch pedal assembly of a cable actuated clutch system. In this manner, further modification to the vehicle design is avoided, thereby reducing overall manufacturing and design costs of the vehicle.

Additional advantages and features of the present invention will become apparent from the subsequent description and the appended claims, taken in conjunction with the accompanying drawings.

DETAILED DESCRIPTION OF THE DRAWINGS

Figure 3A:
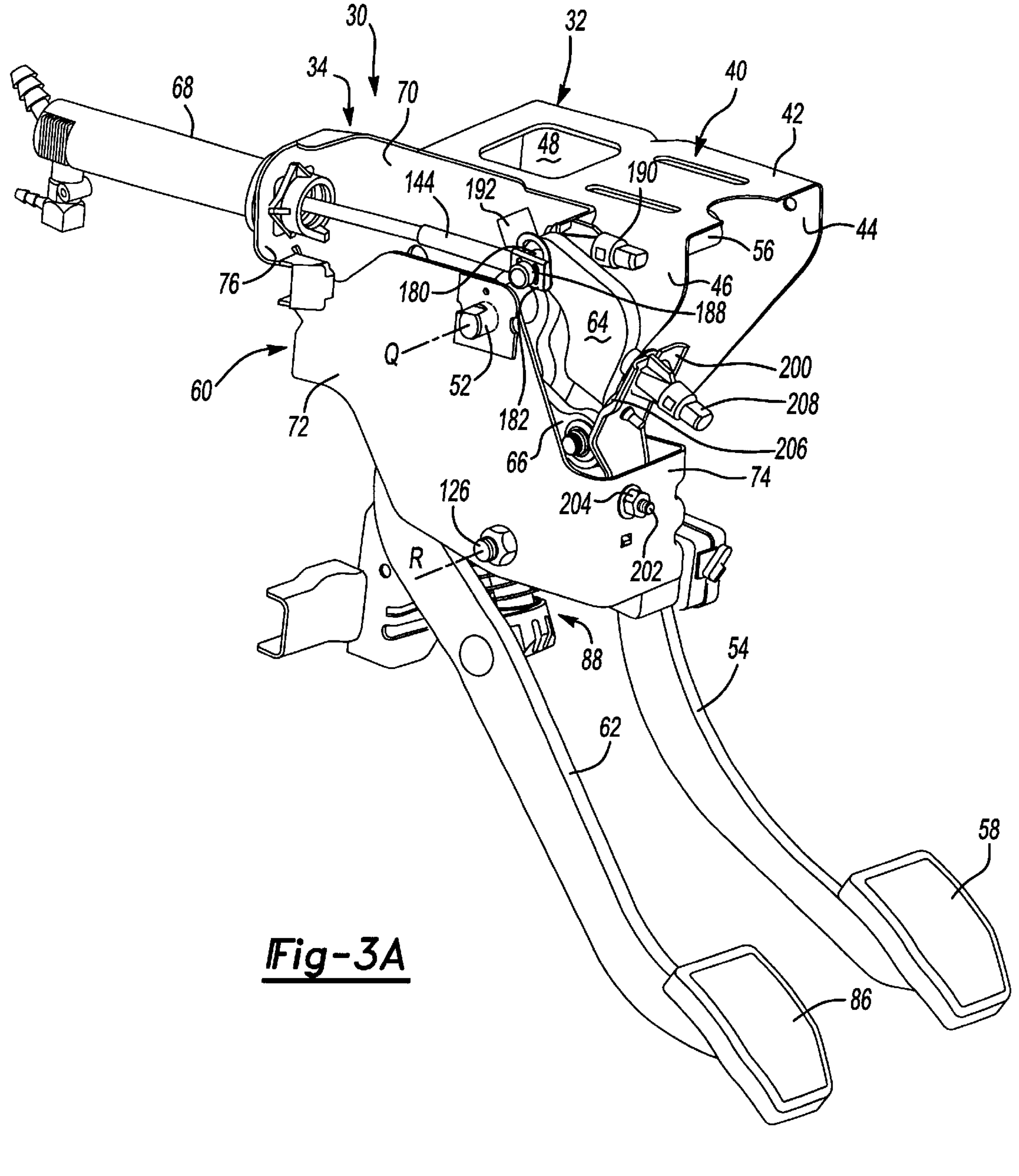

FIG. 3*a* is a perspective view of a clutch and brake pedal assembly according to the principles of the present invention.

Figure 3B:
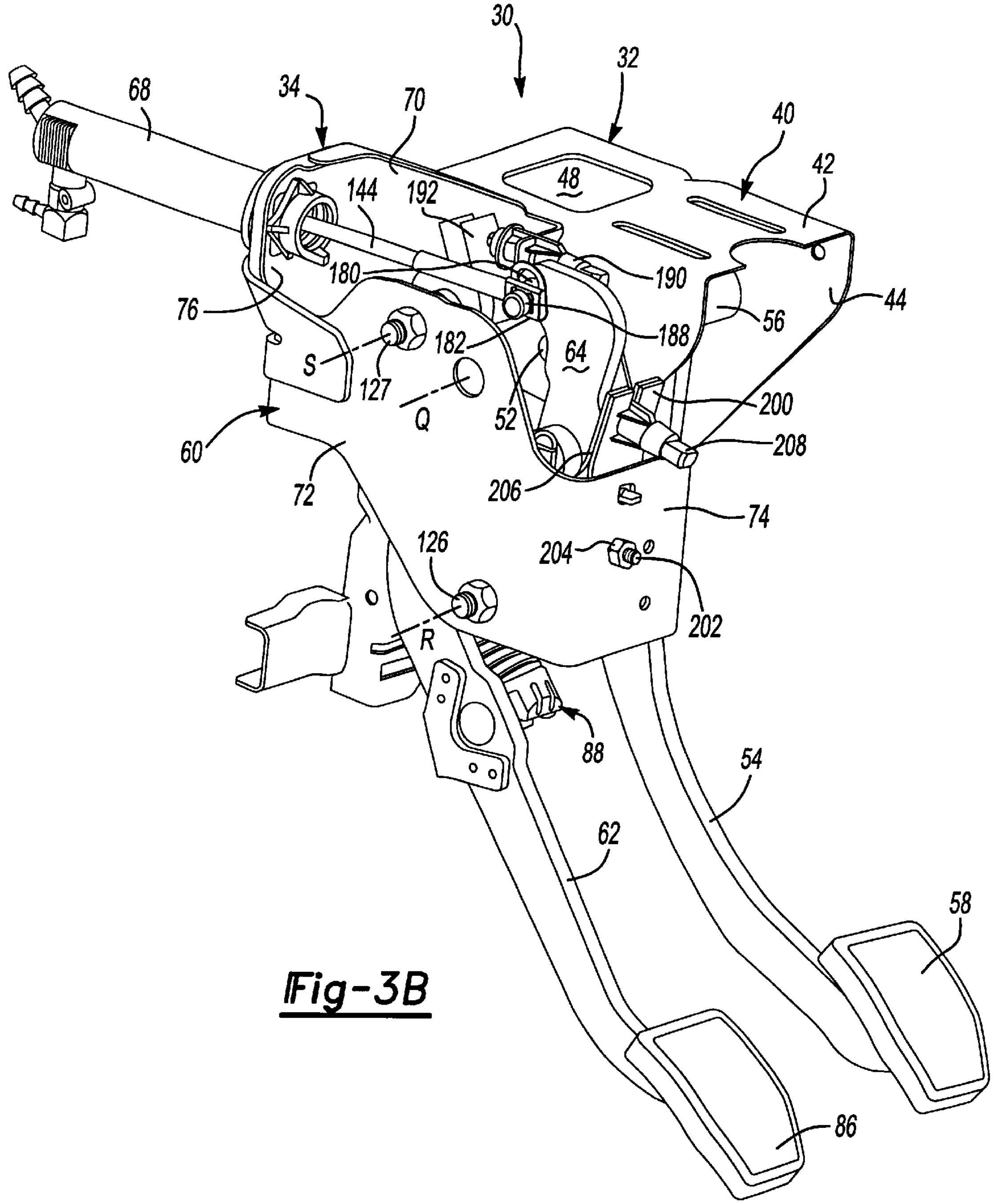

FIG. 3*b* is a perspective view of an alternative embodiment of the clutch and brake pedal assembly according to the principles of the present invention.

Figure 4:
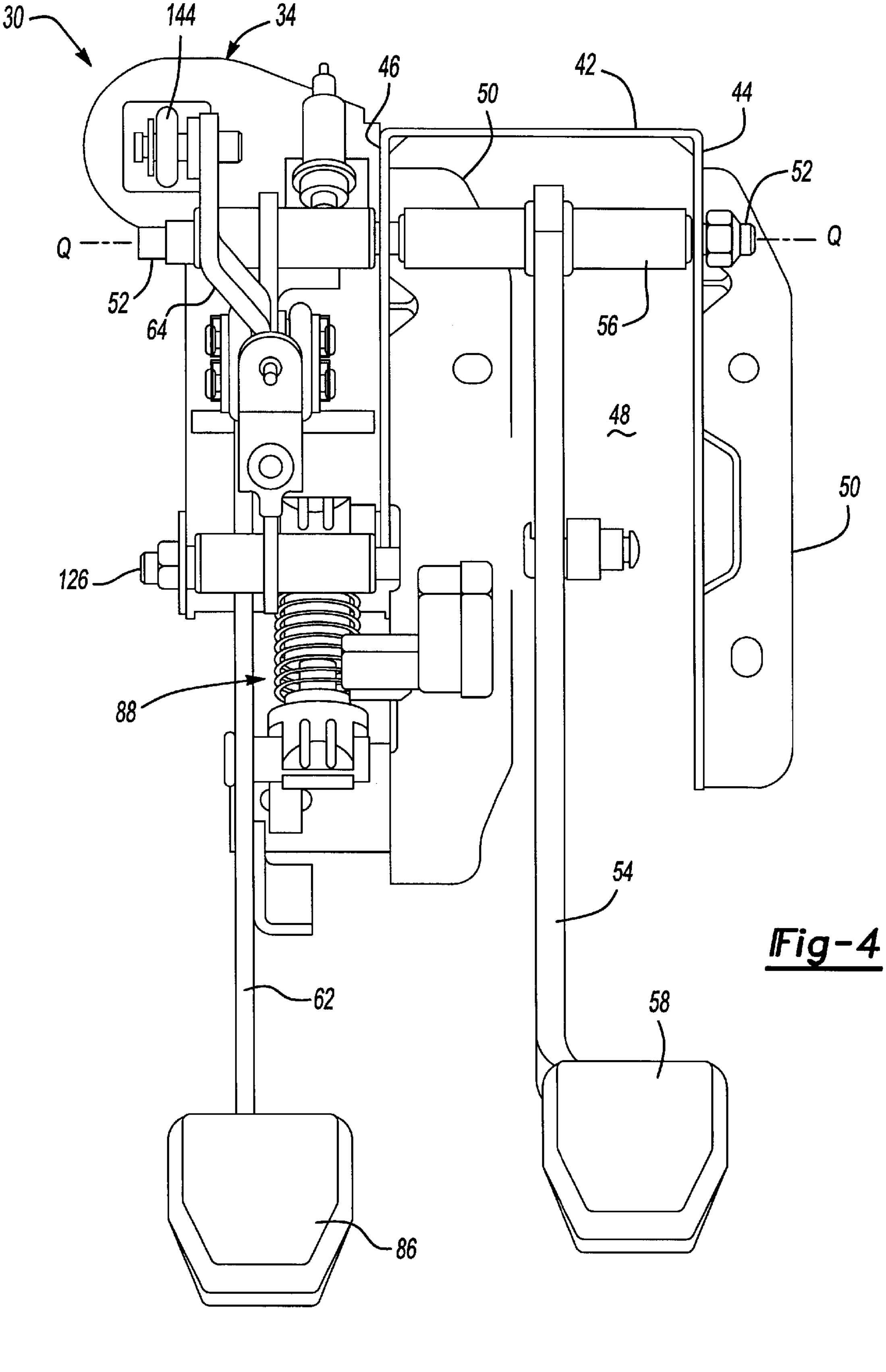

FIG. 4 is a rear view of the clutch and brake pedal assembly as installed in the vehicle.

Figure 5:
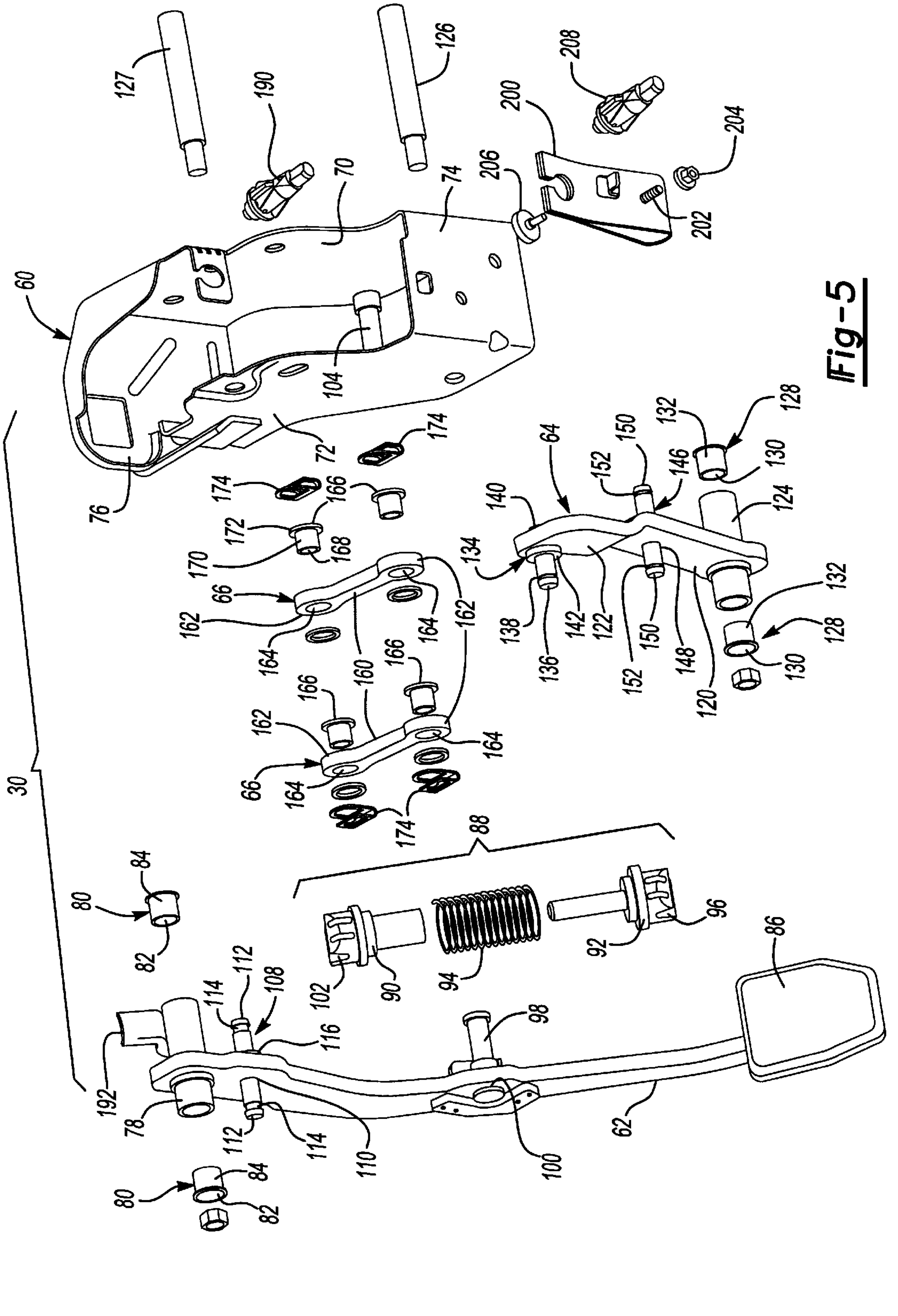

FIG. 5 is an exploded perspective view of a clutch pedal sub-assembly of the clutch and brake pedal assembly of FIG. 3.

Figure 6:
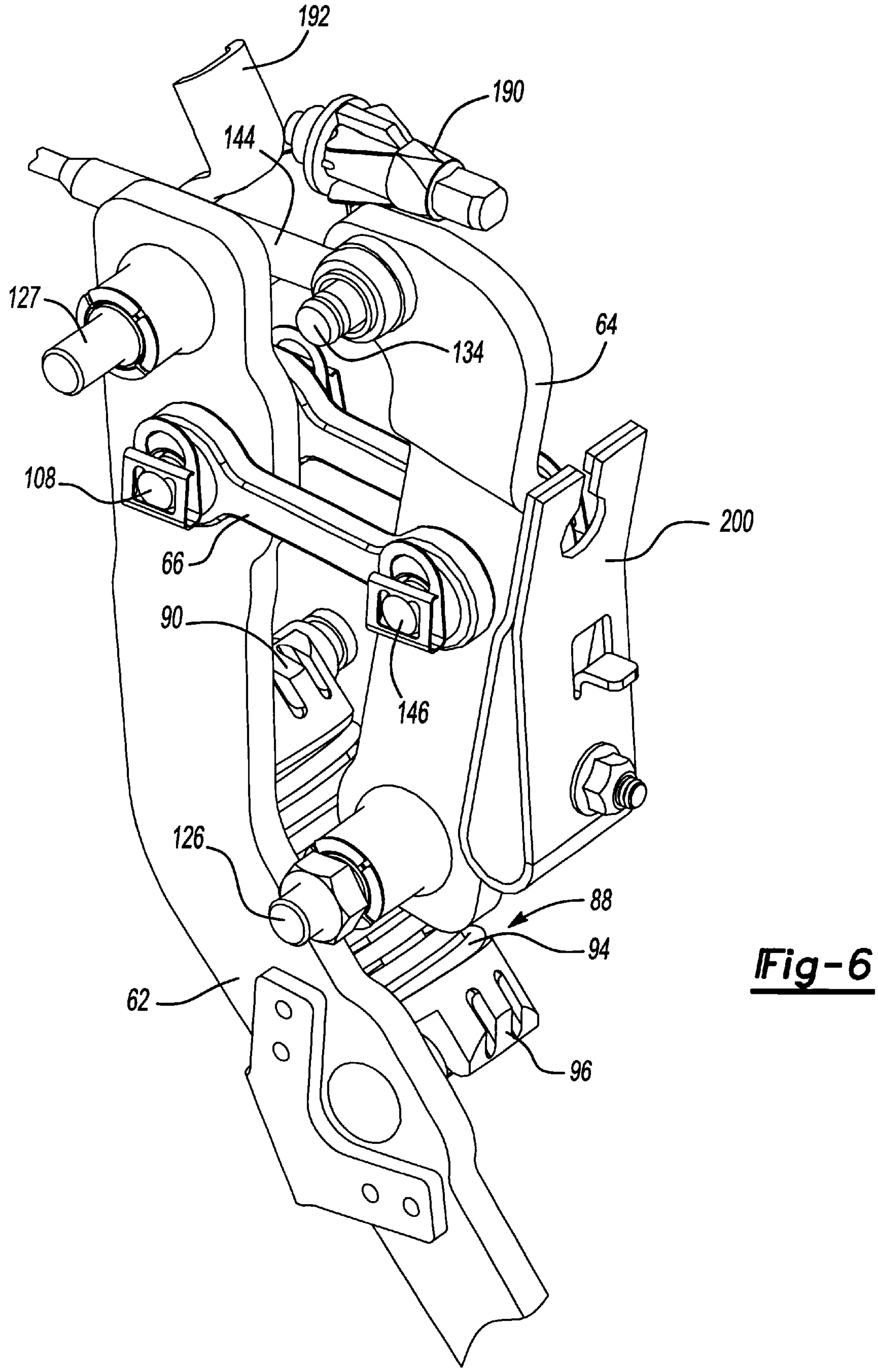

FIG. 6 is a perspective view of a portion of the clutch pedal sub-assembly.

Figure 7:
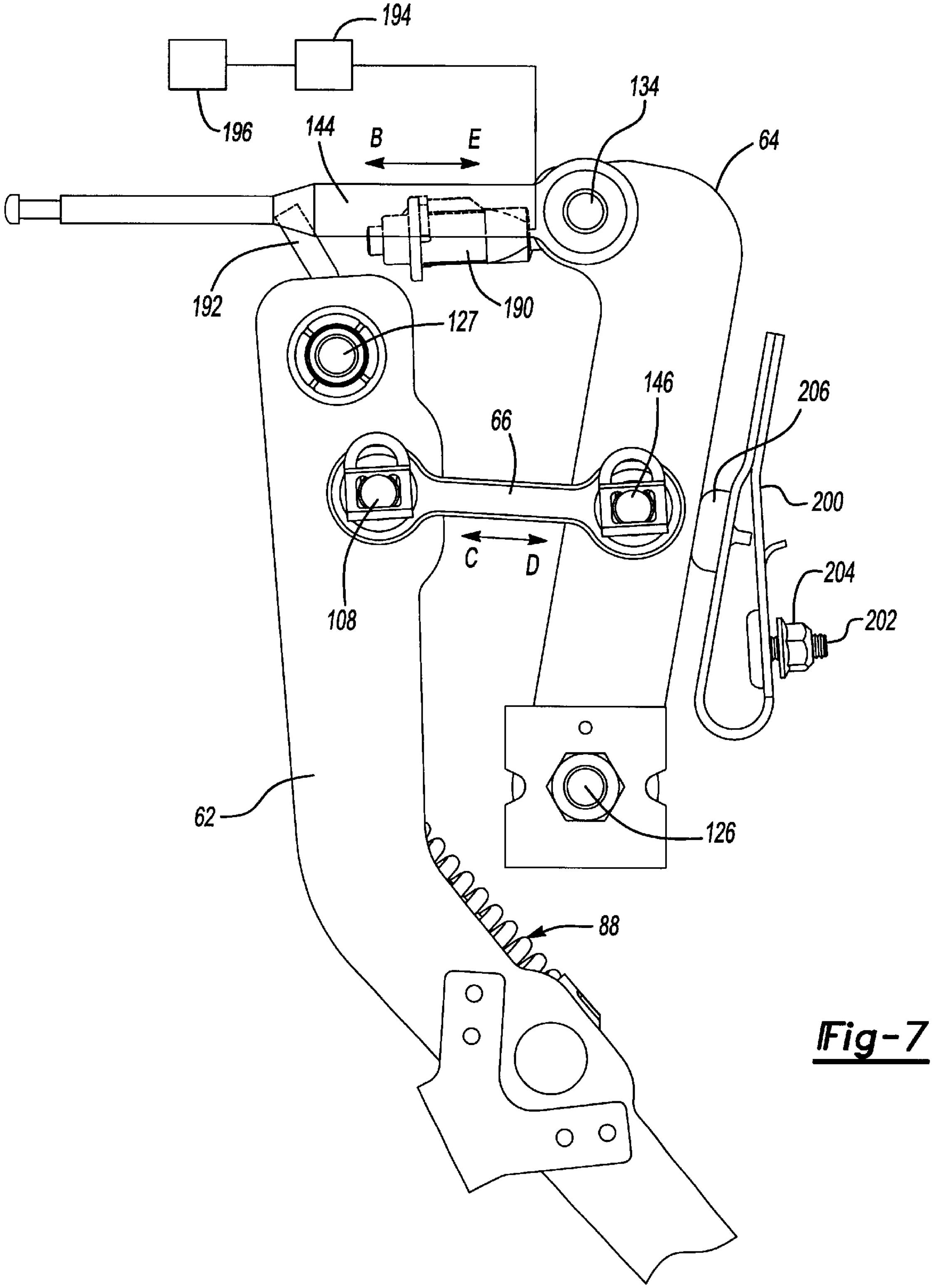

FIG. 7 is a side view of the portion of the clutch pedal sub-assembly shown in FIG. 6.

DETAILED DESCRIPTION OF THE PREFERRED EMBODIMENT

Traditional clutch systems for vehicles may either be cable actuated or hydraulically actuated. Referencing FIGS. 1 and 2, typical cable and hydraulic clutch pedal assemblies 10,12 are respectively shown. The clutch pedal assemblies 10,12 commonly include a clutch arm 14 having a pedal 16 disposed on one end. The clutch arm 14 is pivotably supported about a fulcrum X. An attachment point Y is also included for attaching either a clutch cable 18 or a push rod 20 to the clutch arm 14.

Figure 1:
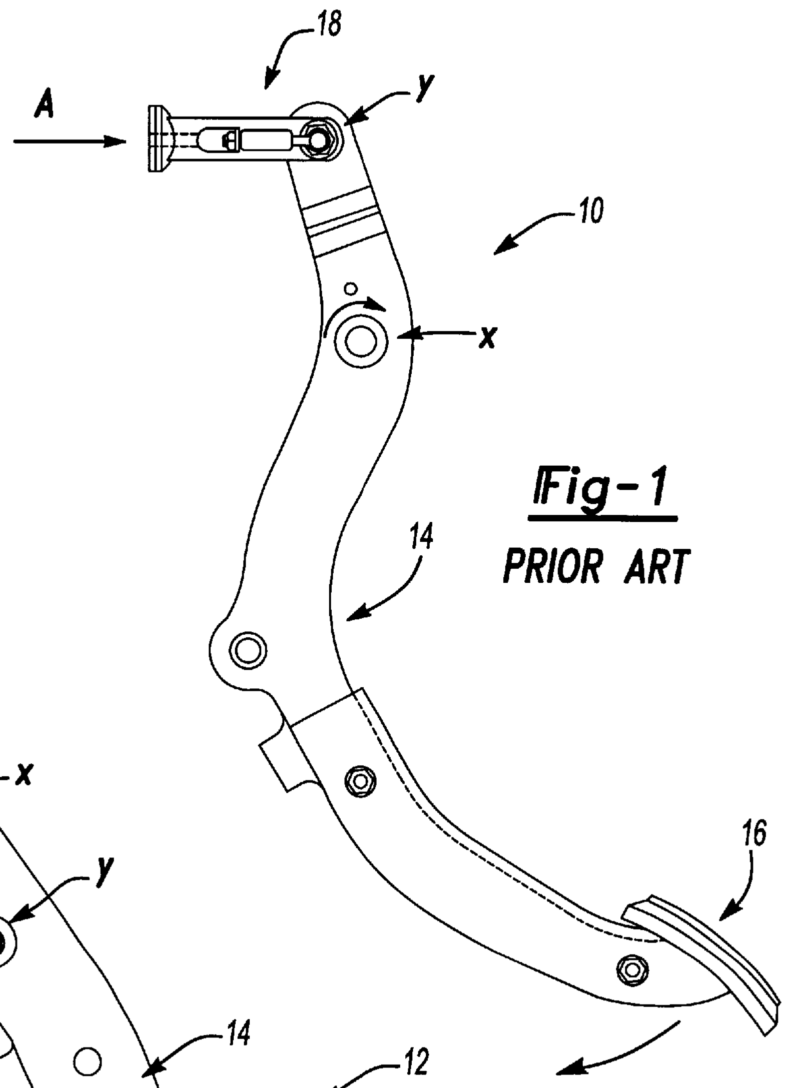
Fig-1 PRIOR ART
FIG. 1 is a side schematic view of a prior art clutch pedal assembly for actuating a cable clutch system.

With particular reference to FIG. 1, the clutch cable actuated clutch pedal assembly 10 includes the cable 18 attached to the clutch arm 14 at the attachment point Y. The fulcrum X of the cable clutch pedal assembly 10 is disposed along an intermediate portion of the clutch arm 14 and the cable attachment point Y is disposed at an end of the clutch arm 14, opposite the pedal end. As an operator depresses the pedal 16, the clutch arm 14 is caused to pivot about the fulcrum X, in a clockwise direction. Thus, attachment point Y is also caused to pivot in a clockwise direction pulling the cable 18 in a direction A for actuating the clutch release system (not shown).

Figure 2:
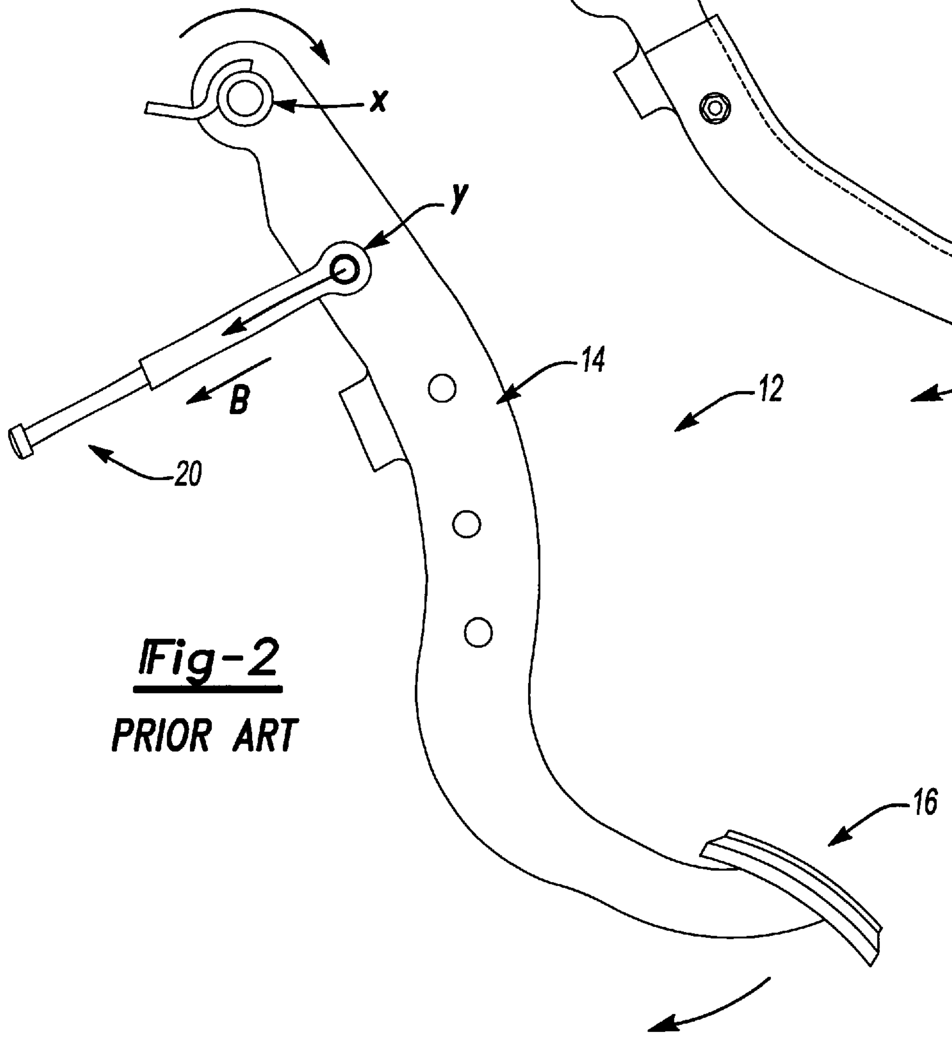
Fig-2 PRIOR ART
FIG. 2 is a side schematic view of a prior art clutch pedal assembly for actuating a hydraulic clutch system.

With particular reference to FIG. 2, the hydraulically actuated clutch pedal assembly 12 includes the push rod 20 attached to the clutch arm 14 at attachment point Y. The fulcrum X of the clutch pedal assembly 12 is disposed at an end of the clutch arm 14, opposite the pedal end, and the attachment point Y is located at an intermediate portion of the clutch arm 14. Having this configuration, as the pedal 16 is depressed the clutch arm 14 is caused to pivot about the fulcrum X, in the clockwise direction. Thus, attachment point Y is also caused to pivot in the clockwise direction pushing the push rod 20 in a direction B for actuating the clutch system (not shown).

The present invention provides a clutch pedal assembly that enables the use of a clutch arm generally having a cable actuated clutch system geometry to be used with a hydraulic actuated clutch system. With reference to FIGS. 3*a*, 3*b* and 4, perspective and front views of a brake and clutch pedal assembly 30 are shown. The brake and clutch pedal assembly 30 includes interconnected brake pedal and clutch pedal sub-assemblies 32,34, respectively.

The brake pedal sub-assembly 32 includes a support bracket 40 having a top plate 42 and first and second side plates 44,46 defining an interior space 48. Each of the first and second side plates 44,46 further include an attachment plate 50 extending therefrom. Each attachment plate 50 enables attachment of the brake and clutch pedal assembly 30 to a vehicle (not shown). A pivot shaft 52 is supported between the first and second side plates 44,46 and itself, pivotally supports a brake arm 54 about a rotational axis Q. The brake arm 54 is generally arcuate in shape and includes a first end having a cylindrical hub 56 attached thereto. The pivot shaft 52 is received through the cylindrical hub 56 for rotatably supporting the brake arm 54 about the axis Q. A brake pedal 58 is disposed on a second end of the brake arm 54 enabling actuation of the brake arm 54 by an operator. The brake arm 54 is in mechanical communication with a hydraulic master cylinder (not shown) for selectively activating a hydraulic brake system (not shown).

The clutch pedal sub-assembly 34 includes a support bracket 60 that pivotally supports a clutch arm 62 and an actuator arm 64. The clutch and actuator arms 62,64 are interconnected via a pair of drag links 66. The actuator arm 64 is further connected to a master cylinder 68 of a hydraulic clutch system (not shown). As the clutch arm 62 is caused to pivot within the clutch sub-assembly 34, the actuator arm 64 also pivots, thus actuating the hydraulic clutch release system.

The support bracket 60 includes first and second side plates 70,72 a front plate 74 and a rear plate 76. The support bracket 60 is preferably constructed from a single stamped plate, however, it is foreseen that the support bracket could include individual plates fixedly attached to one another. In accordance with a second preferred embodiment, a pivot shaft 127 extends through the first and second side plates 70,72 of the support bracket 60 of the clutch pedal sub-assembly 34 (as seen in FIG. 3*b*). The pivot shaft 127 pivotally supports the clutch arm 62 within the support bracket 60. However, it is anticipated that the pivot shaft 52 could extend from the support bracket 40 of the brake pedal sub-assembly 32 through the first and second side plates 70,72 of the support bracket 60 of the clutch pedal sub-assembly 34, for pivotally supporting the clutch arm 62 within the support bracket 60. (As seen in FIG. 3A.)

With particular reference to FIG. 5, the clutch arm 62 is generally arcuate in shape and includes a cylindrical hub 78 disposed at a first end. The pivot shaft 127 is received through bushings 80 disposed within either side of the cylindrical hub 78 for rotatably supporting the clutch arm 62 about the rotational axis S. Each bushing 80 includes an interior and exterior bearing surface 82,84, respectively, for providing a smooth interface between the cylindrical hub 78 and the pivot shaft 127. A second end of the clutch arm 62 includes a clutch pedal 86 for actuation of the clutch arm 62 by an operator.

A spring assembly 88 is provided for biasing the clutch arm 62 in a first direction. The spring assembly 88 includes an upper fitting 90 slidably interfacing a lower fitting 92. Opposing ends of a spring 94 are seated to the upper and lower fittings 90,92 respectively, whereby the spring 94 biases the upper and lower fittings 90,92 together. The lower fitting 92 of the spring assembly 88 includes a clip 96 that rotatably attaches to a first pin 98. The first pin 98 is fixedly attached to the clutch arm 62 through an aperture 100 of the clutch arm 62. The upper fitting 90 of the spring assembly 88 also includes a clip 102 that rotatably attaches to the support bracket 60 via a second pin 104. The second pin 104 is fixedly attached to the first side plate 70 of the support bracket 60 and the second side plate 46 of the support bracket 40. The spring assembly 88 biases the clutch arm 62 in a generally counter-clockwise direction relative to the support bracket 60.

The clutch arm 62 further includes a first drag link pin 108 secured through an aperture 110. The first drag link pin 108 includes posts 112 extending generally perpendicular to either side of the clutch arm 62. The posts 112 each include a groove 114 formed in a distal end. The drag links 66 attach to the clutch arm 62 via the posts 112, as described in further detail hereinbelow. The first drag link pin 108 also includes a centrally disposed, radially extending disc 116 for locating the first drag link pin 108 within the aperture 110.

The actuator arm 64 includes a straight lower portion 120 and a curved upper portion 122 stepped to one side relative to the straight lower portion 120. An end of the straight lower portion 120 includes a cylindrical hub 124 fixedly attached and disposed therethrough. A pivot shaft 126 is received through bushings 128 disposed within either side of the cylindrical hub 124 for rotatably supporting the actuator arm 64 about a rotational axis R. Each bushing 128 includes an interior and exterior bearing surface 130,132, respectively, for providing a smooth interface between the cylindrical hub 124 and the pivot shaft 126. The pivot shaft 126 is supported between the first and second side plates 70,72 of the support bracket 60. An end of the curved upper portion 122 includes a push rod pin 134 having a perpendicularly extending cylindrical post 136 with a groove 138 formed in the end. The push rod pin 134 seats within an aperture 140 of the actuator arm 64 and includes a centrally disposed, radially extending disc 142 for locating the push rod pin 134 in the aperture 140. The push rod pin 134 enables interconnection between the actuator arm 64 and a push rod 144, as described in further detail hereinbelow.

The straight lower portion 120 of the actuator arm 64 further includes a second drag link pin 146 secured through an aperture 148. The second drag link pin 146 includes posts 150 extending generally perpendicular to either side of the actuator arm 64. The posts 150 each include a groove 152 formed in a distal end. The drag links 66 attach to the actuator arm 64 via the posts 150, as described in further detail hereinbelow.

As previously described, the clutch arm 62 and actuator arm 64 are interconnected via a pair of drag links 66. The drag links 66 are supported between the posts 112,150 of the first and second drag link pins 108,146, respectively. The drag links 66 each include an intermediate link 160 having rounded ends 162 with apertures 164 therethrough. Each aperture 164 initially receives a bushing 166 therein, each bushing 166 having an interior and an exterior bearing surface 168,170, respectively and a shoulder 172. The shoulder 172 properly seats the bushing 166 within the aperture 164. The drag links 66 and assembled bushings 166 are received onto the posts 112 of the clutch arm 62 and the posts 150 of the actuator arm 64, whereby the posts 112,150 are received through the bushings 166. The interior and exterior bearing surfaces 168,170 of the bushings provide a smooth interface between the posts 112,150 and the drag links 66. Clips 174 are received onto the posts 112,150 and are attachable to the grooves 114,152 of the posts 112,150, respectively for retaining the drag links 66 on the posts 112,150.

The push rod 144 is in mechanical communication with the master cylinder 68 of a hydraulic clutch system (not shown) as described in further detail hereinbelow. The push rod 144 includes a first end having an aperture 180 therethrough. The aperture 180 receives a bushing 182 having interior and exterior bearing surfaces (not shown). The cylindrical post 136 of the push rod pin 134 is received through the assembled bushing 182 and a clip 188 is assembled onto the post 136 and secured within the groove 138 for holding the push rod 144 onto the post 136.

As best described with respect to FIGS. 5, 6, & 7, to actuate the hydraulic clutch system an operator depresses the pedal 86 of the clutch arm 62. As the pedal 86 is depressed, the clutch arm 62 rotates clockwise about the rotational axis S, against the biasing force of the spring assembly 88. Clockwise rotation of the clutch arm 62 about the rotational axis S includes clockwise rotation of the first drag link pin 108, about the axis S, thus pulling the drag links 66 in a direction C. Pulling of the drag links 66 in the direction C causes the actuator arm 64 to rotate in a counter-clockwise direction about the rotational axis R, thus pushing the push rod 144 in the direction B, as described above for the prior art hydraulic clutch assembly (see FIG. 2). The push rod 144 is thus pushed into the master cylinder of the hydraulic clutch system thereby activating the hydraulic clutch (not shown).

As the operator relieves downward pressure on the clutch pedal 86, the clutch arm 62 is returned by a hydraulic load translated through the hydraulic master cylinder assembly 68 and the push rod 144. The spring assembly 88 assists by biasing the clutch arm 62 in a counter-clockwise direction about the rotational axis S. The hydraulic load applies a force through the pushrod 144 in the direction E, opposite the direction B, thus causing clockwise rotation of the actuator arm 64 about the rotational axis R includes clockwise rotation of the first drag link pin 146, thus tensioning the drag links in a direction D, opposite the direction C. Tensioning the drag links 66 in the direction D causes the clutch arm 62 to rotate in a counter-clockwise direction about the rotational axis S, thereby deactivating the hydraulic clutch release system (not shown).

The clutch pedal sub-assembly 34 further includes a motor start sensor 190 mounted to the support bracket 60. The motor start sensor 190 is positioned whereby it is engageable by a bracket 192 of the clutch arm 62. The bracket 192 is fixedly attached to and extends from the cylindrical hub 78. Sufficient rotation of the clutch arm 62 about the rotational axis S results in the bracket 192 contacting, and thus triggering the motor start sensor 190. The motor start sensor 190 is in electrical communication with an ignition circuit 194, which is further in electrical communication with a motor start system 196. This relationship is shown schematically in FIG. 7. The motor start sensor 190 must be initially engaged by the bracket 192 in order to enable the ignition circuit 194 to trigger activation of the motor start system 196. In this manner, the clutch release system must be activated prior to starting the vehicle.

An auxiliary bracket 200 is also included and is attached to the front plate 74 via a bolt 202 and nut 204. The auxiliary bracket 200 retains a stopper 206, against which the actuator arm 64 rests when the clutch pedal 86 is at rest. The auxiliary bracket also retains a second sensor 208 (as shown in FIG. 5) that is in selective contact with the actuator arm 64. In an exemplary embodiment, the second sensor 208 signals disengagement of the "cruise-control" when the clutch pedal 86 is depressed. It is anticipated, however, that the second sensor 208 may be in electrical communication with other vehicle systems.

The hereindescribed clutch pedal sub-assembly enables implementation of a hydraulic clutch release system in a vehicle generally designed for use with a cable actuated clutch system. In this manner, features such as apertures through vehicle dash panel that enable passage of linkage to the clutch pedal components may be commonly located whether a hydraulically actuated or cable actuated clutch system is used. Thus, only a single design is required as opposed to dual designs, having the overall effect of decreasing both development and manufacturing costs.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A pedal assembly comprising:

a support bracket;

a first arm pivotally supported at a first end about a first pivot axis by said support bracket; and a second arm pivotally supported at a first end about a second pivot axis by said support bracket and having a second end in mechanical communication with an external system;

wherein said first and second arms are in mechanical communication, whereby pivoting of said first arm produces corresponding pivoting of said second arm, said first and second arms being operatively connected via at least one drag link, and wherein a first end of said at least one drag link is connected to said first arm generally below said first pivot axis and a second end of said at least one drag link is connected to said second arm generally above said second pivot axis.

2. The pedal assembly of claim 1, said second pivot axis is positioned generally below said first pivot axis.

3. The pedal assembly of claim 1, wherein said external system is a hydraulic clutch system.

4. The pedal assembly of claim 1, wherein said first arm is biased in a first direction by a biasing member.

5. The pedal assembly of claim 4, wherein said biasing member is a spring.

6. The pedal assembly of claim 1, further comprising a sensor mounted to said support bracket whereby sufficient pivoting of said first arm within said support bracket actuates said sensor.

7. The pedal assembly of claim 6, wherein said sensor is a start sensor for selectively enabling electrical communication between an ignition circuit and a motor start system.

8. The pedal assembly of claim 6, wherein said sensor is a cruise control deactivation sensor in electrical communication with a cruise control system.

* * * * *